United States Patent [19]

Hagberg

[11] 3,928,300

[45] Dec. 23, 1975

[54] FALLING STRAND DEVOLATILIZATION TECHNIQUE

[75] Inventor: Carl G. Hagberg, Ballwin, Mo.

[73] Assignee: Monsanto Company, St. Louis, Mo.

[22] Filed: Jan. 9, 1973

[21] Appl. No.: 322,261

[52] U.S. Cl. .......... 260/93.5 A; 159/2 R; 159/13 A; 159/DIG. 10; 260/93.5 R; 260/96
[51] Int. Cl.$^2$.... B01D 1/08; B01D 1/22; B01D 1/28
[58] Field of Search............ 260/93.5 R, 93.5 A, 96; 159/DIG. 10, 2 R, 13 A

[56] References Cited
UNITED STATES PATENTS

| | | | |
|---|---|---|---|
| 2,914,120 | 11/1959 | Hunt et al. | 159/13 A |
| 2,970,089 | 1/1961 | Hunt et al. | 159/DIG. 10 |
| 3,004,900 | 10/1961 | Hunt et al. | 159/DIG. 10 |

Primary Examiner—John C. Bleutge
Attorney, Agent, or Firm—Joseph S. Nelson; Edward P. Grattan; James C. Logomasini

[57] ABSTRACT

A continuous process for regulating the production of low molecular weight polymer within a starting composition of homopolystyrene and styrene monomer which is subjected to falling strand devolatilization. In one mode of the invention, a process is provided wherein the production of styrene oligomers is minimized during falling strand devolatilization of a homopolystyrene/styrene monomer composition. The invention also includes an improved falling strand devolatilization apparatus especially adapted for the practice of the present invention.

6 Claims, 13 Drawing Figures

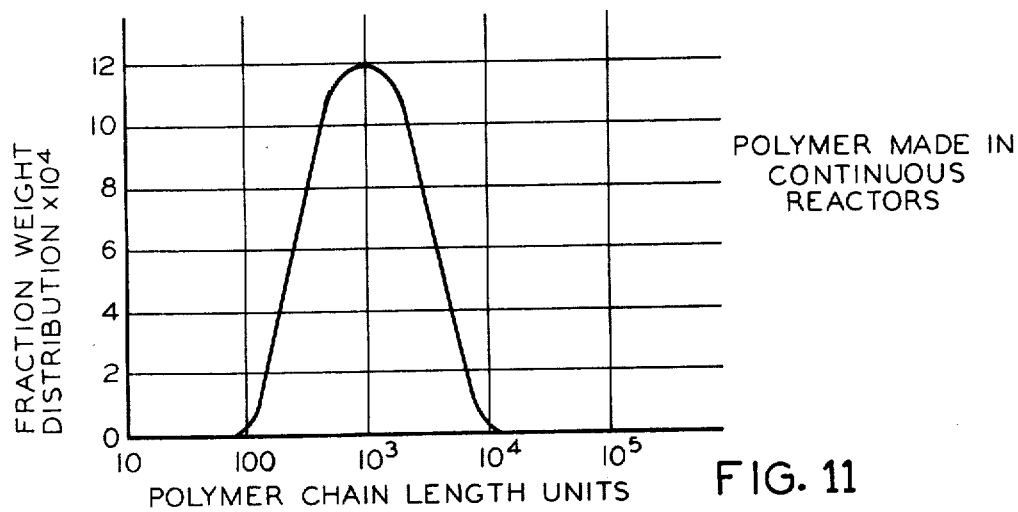
FIG. 11 — POLYMER MADE IN CONTINUOUS REACTORS
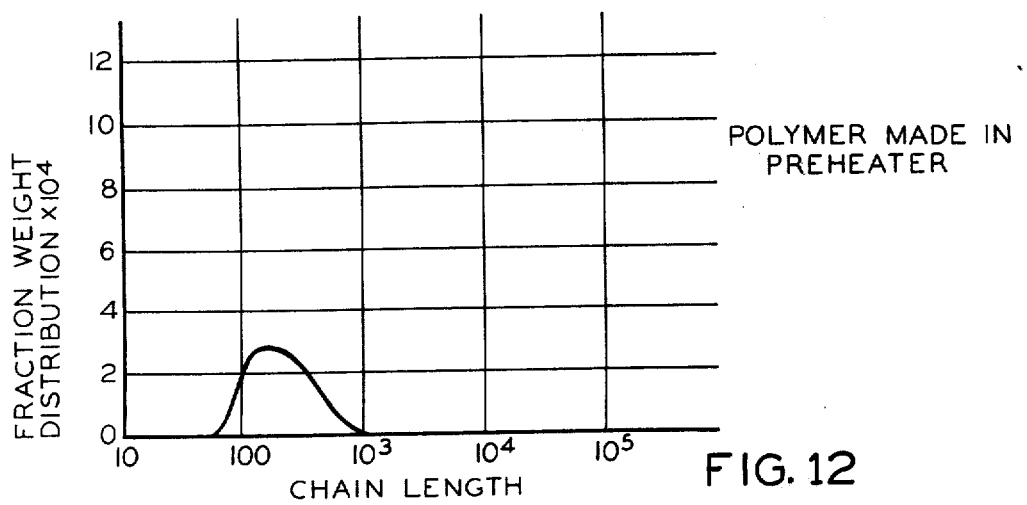
FIG. 12 — POLYMER MADE IN PREHEATER
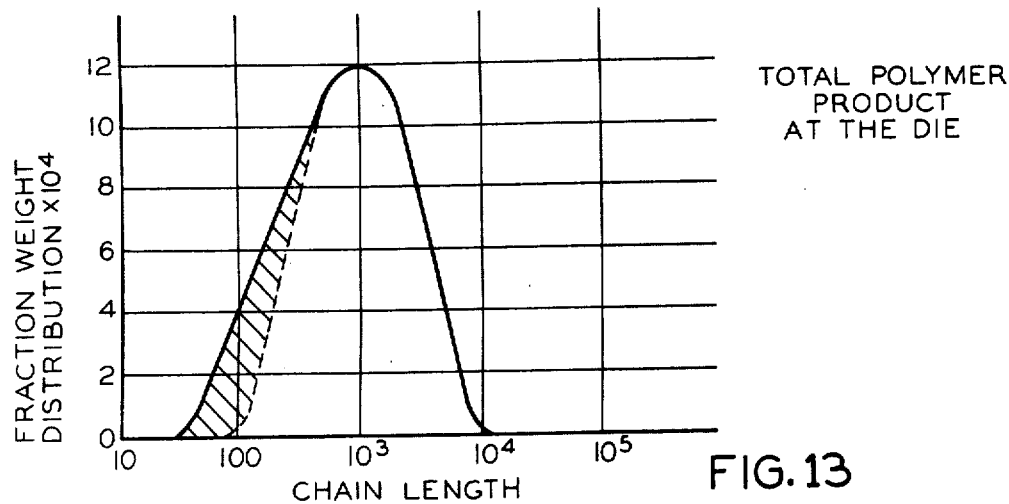
FIG. 13 — TOTAL POLYMER PRODUCT AT THE DIE

FALLING STRAND DEVOLATILIZATION TECHNIQUE

BACKGROUND

In the manufacture of homopolystyrene, and elastomer-modified versions thereof of the type containing graft polymerized diene rubber particles dispersed in a homopolystyrene matrix, especially by continuous mass polymerization methods, it is necessary after polymerization to separate from the polymer unreacted styrene monomer. To accomplish such a separation, it is heretofore been common to boil off the styrene monomer from the polymer under conditions of elevated temperature and (preferably) sub-atmospheric pressures, this process commonly being termed devolatilization.

One class of apparatus used for styrene devolatilization involves the combination of a preheater, which is typically a shell and tube heat exchanger, and a flash tank connected therewith. Thus, a mixture of homopolystyrene and styrene monomer (with or without grafted diene rubber distributed therein) in the form of a hot melt is continuously passed through the tubes of the preheater and heated to a temperature above the boiling point of styrene monomer but below the decomposition (or vaporization) point of the styrene polymer. Thereafter, this heated mixture is passed directly into an upper portion of the flash tank. The interior of the flash tank is maintained at elevated temperatures and (preferably) reduced pressures. The melt mixture passed into the flash tank is caused to drop through a region in the flash tank in the form of strands or globules. As a result, most of the unreacted monomer is removed continuously as a vapor from a vent in the tank which is usually located above the melt input port in the tank. Such an apparatus is termed a falling strand devolatilizer.

Falling strand devolatilization, however, has heretofore had associated with it a serious drawback in that such devolatilization has been observed to produce in the devolatilized product polymer significant quantities of oligomers (dimers and trimers of styrene). The concentration of such oligomers in such product polymer can be such as to alter polymer product properties adversely which results in the production of an offgrade material. This oligomer production problem during falling strand devolatilization has tended to limit utilization of falling strand devolatilization when manufacturing homopolystyrene products particularly using mass polymerization technology.

All styrene polymers have some small amount of oligomers associated with them. The method of utilizing a preheater in a process of vaporizing the monomer inherently generates more oligomers than does certain other types of devolatilization methods such as wiped film devolatilization. Oligomer production in falling strand devolatilization tends to result because preheater tube surfaces through which heat passes to heat up the polymer melt passing therethrough are not wiped clean which tends to promote the production of oligomers in the relatively large layer of melt which tends to adhere near the tube inner wall surfaces.

It has now been discovered that by the use of an unconventional type of shell and tube preheater in a falling strand devolatilization technique, one can reduce the relative quantity (to total polymer) of oligomers made to a level such that the quantity of oligomers in the devolatilized product is not greater than the amount of oligomers in polymer product made by wiped film type devolatilization. Specifically, the present discovery relies on the fact that by using short length tubes having an appropriate internal diameter in combination with associated carefully selected preconditions for the flash chamber into which the heated stream from the tubes of the preheater are deposited results in the control and minimization if desired of low molecular weight polymer and oligomers.

It is thus an object of the present invention to provide apparatus and processes enabling one to carry out falling strand devolatilization on a homopolystyrene/styrene monomer composition without concurrently making excessive offgrade polymer or oligomers.

Another object of the present invention is to provide an apparatus in which one may carry out falling strand devolatilization of homopolystyrene polymer/styrene monomer mixture to remove styrene monomer from polymer while simultaneously controlling at different levels the amount of polymer in the starting composition which is inherently converted to low molecular weight polymeric material during devolatilization, as well as processes for utilizing such apparatus and the accomplishment of such objective. Other further objects of this invention will occur to those skilled in the art from a reading of the present specification and drawings taken with the claims.

SUMMARY

In one aspect, the present invention relates to processes adapted for use in the falling strand devolatilization of a mixture of homopolystyrene and styrene monomer by falling strand technology. In one mode, the present invention thus provides a process in which the production of low molecular weight polymer is controlled at a specified level within a typical range of from about 2 to 15 weight per cent based on total devolatilized product weight (though those skilled in the art will realize that somewhat smaller or larger ranges can exist in an additional situation, depending upon the process conditions and the type of apparatus employed). The process uses as a starting process fluid a composition comprising from about 50 to 85 weight per cent homopolystyrene, and, correspondingly, from about 50 to 15 weight per cent monomer (such weight per cent being on a 100 weight per cent total composition basis). Such composition is subjected to falling strand devolatilization of the type wherein such composition is subjected first to heating and then to flash vaporization. Such composition is at an initial input temperature to the heating zone of from about 130° to 200°C, and such composition as fed to such heating zone is at an initial pressure of from about 5 to 50 psi.

Such a starting composition at such an initial input temperature and pressure is thus passed into and through the tube portions of a shell and tube preheater assembly. In such assembly, each tube can be regarded as a single heating zone, for process purposes, and each individual heating zone has a generally columnar shape. Each heating zone thus has a length of from about 2 to 8 feet and an average (inside) diameter which is generally constant with respect to such length thereof and which ranges from about 0.5 to 1.5 inches. The ratio of such length to such diameter of an individual heating zone ranges from about 30 to 80. The relationship between such composition and the sum of the individual members of such heating zones is such that the amount of such composition passing through such heating zones ranges from about 3 to 20 pounds/hr. per heating zone.

Each one of such heating zones has its side wall portions defined by a heat exchange solid surface whose total heat flux relative to such composition passing therealong ranges from about 500 to 4,000 BTU per hr. per square foot. The residence time of each portion of such composition in a given one of such heating zones ranges from about 2 to 10 minutes.

The output temperature of such composition as it exits from each individual one of such heating zones ranges from about 40° to 160°C. greater than the above indicated input temperature of a given composition. The output pressure of such a composition as it exits from each individual one of said heating zones ranges from about 5 to 50 psi less than the input pressure (of a given starting composition).

As discharged from such heating zones, a so heated composition passes into a flash vaporization zone which is at least partially downwardly located with respect to such heating zones. In the flash vaporization zone, monomer vapor is separated from the homopolystyrene. In general, the temperature in the flash vaporization zone ranges from about 180° to 280°C. while the pressure in such zone ranges from about 2 to 800 mmHg absolute.

In the flash vaporization zone, simultaneously with the continuous charging of such heated composition to such zone, one continuously removes from such zone the styrene monomer vapor at a rate which is at least approximately equal to the rate of monomer vapor generation.

In a particularly preferred mode of operating a continuous process of the present invention, the production of styrene oligomers is minimized. To practice such mode, one uses a composition and process conditions generally as above indicated except that the pressure in the flash vaporization zone is maintained within the range of from about 2 to 200 mmHg absolute.

In another aspect, the present invention relates to an improved falling strand devolatilization apparatus. Such apparatus includes, among other elements, a vessel adapted for use as a flash chamber in falling strand devolatilization as well as a shell and tube heat exchanger means.

The vessel has an upper portion, a middle portion, and a lower portion, each such portion being generally symmetrically positioned about a central axis which is adapted to be vertically oriented. The lower portion is generally conical in cross-section and terminates in a fluid material discharge orifice. The middle portion is generally cylindrical in cross-section. The upper portion has a relatively large, axially located material input orifice and further has a relatively small, circumferentially located, gaseous material exhaust port means. The vessel has its walls generally circumscribed by heat exchange means adapted to heat such walls to a predetermined temperature during operation of the apparatus.

The shell and tube heat exchange means has a plurality of tube members in spaced, parallel relationship to one another, all enclosed generally within a shell member, the shell member having heat exchange fluid input and output ports therein. This heat exchanger means is mounted in gas tight relationship generally transversely across the above indicated material input orifice of the vessel, the tube members generally being so oriented as to be parallel to the central axis.

The shell and tube heat exchanger means has a common header means mounted in gas tight relationship over the upper ends of the tube members (that is, the tube ends opposed to the downwardly positioned ends within the interior of the vessel). The header has a material input port means therein. Thus, a process fluid may be input into the shell and tube heat exchanger means through such header and the discharge from such shell and tube heat exchanger means (tube portions thereof) directly in the form of ribbons or streams into the interior of the vessel. The relationship between the tube ends and the lower portion of the vessel is such that material discharged from the tube ends drops through a space within at least the middle and perhaps a section of the lower portion of such vessel.

The apparatus further includes first and second pump means. The first pump means, together with associated conduit means, functionally interconnects the material input port means of the header with a source of process fluid, and such first pump means is adapted to supply such process material at a predetermined pressure (as explained above) into the header. The second pump means, together with associated conduit means, functionally interconnects with the gaseous material exhaust port means in the vessel and such second pump means is adapted to evacuate and maintain the interior space in said vessel at a predetermined (usually subatmospheric) pressure.

FIGURE DESCRIPTION

The invention is better understood by reference to the attached drawings wherein:

FIG. 11 is a plot showing the relationship between polymer chain length units versus fractional weight distribution for the homopolystyrene polymer portion of a homopolystyrene polymer/styrene monomer composition used as a starting material in the practice of the present invention;

FIG. 12 is a plot similar to FIG. 11 but showing the relationship between polymer chain length units and fractional weight distribution associated with a typical homopolystyrene polymer made in a preheater assembly when practicing the technique of the present invention;

FIG. 13 is a view similar to FIGS. 11 and 12 but showing the polymer chain length units versus fractional weight distribution thereof for a homopolystyrene polymer made as a result of practicing the techniques of the present invention and comprising essentially a polymer which is a mixture of the individual polymers shown in FIGS. 11 and 12. The shaded area of the curve representing the contribution thereto from the polymer made in the preheater assembly as shown in FIG. 12.

DETAILED DESCRIPTION

Figure 1:
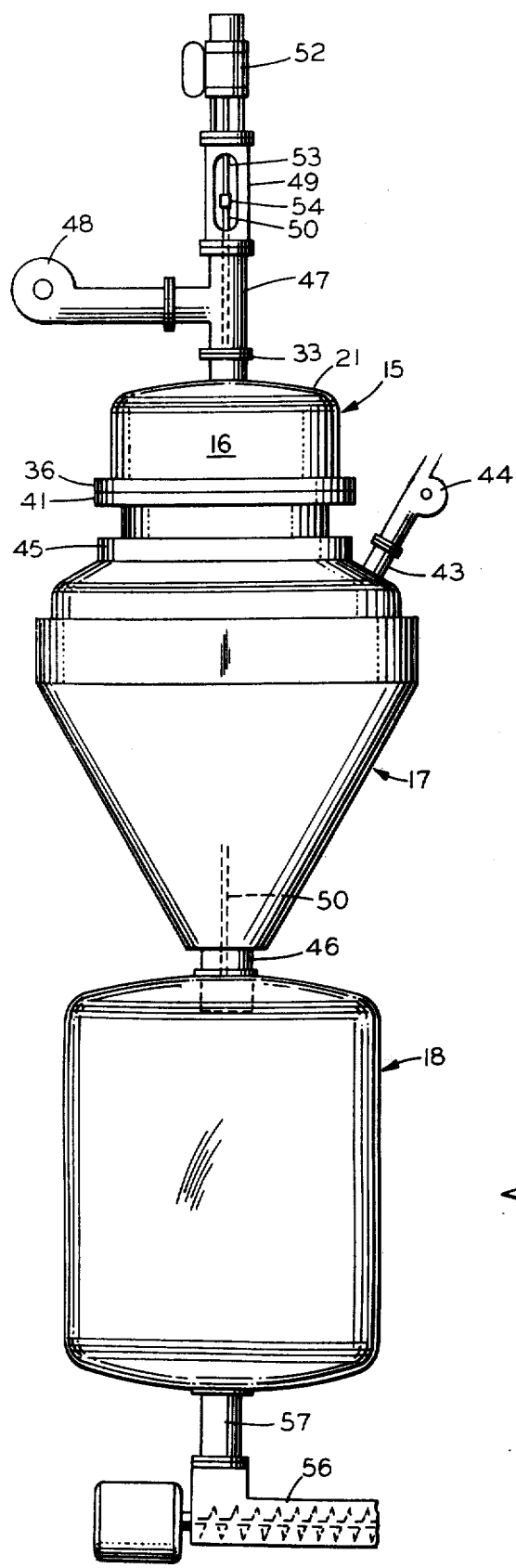
FIG. 1 is a side elevational view in partially schematic form of one embodiment of a falling strand devolatilizer apparatus suitable for use in practicing the technique of the present invention.
Figure 4:
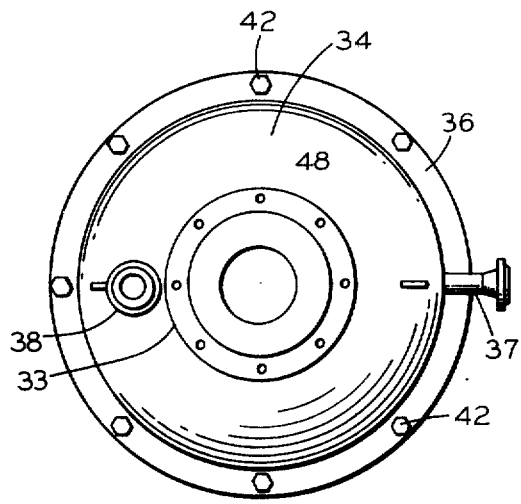
FIG. 4 is a top plan view of the apparatus of FIG. 3.
Figure 6:
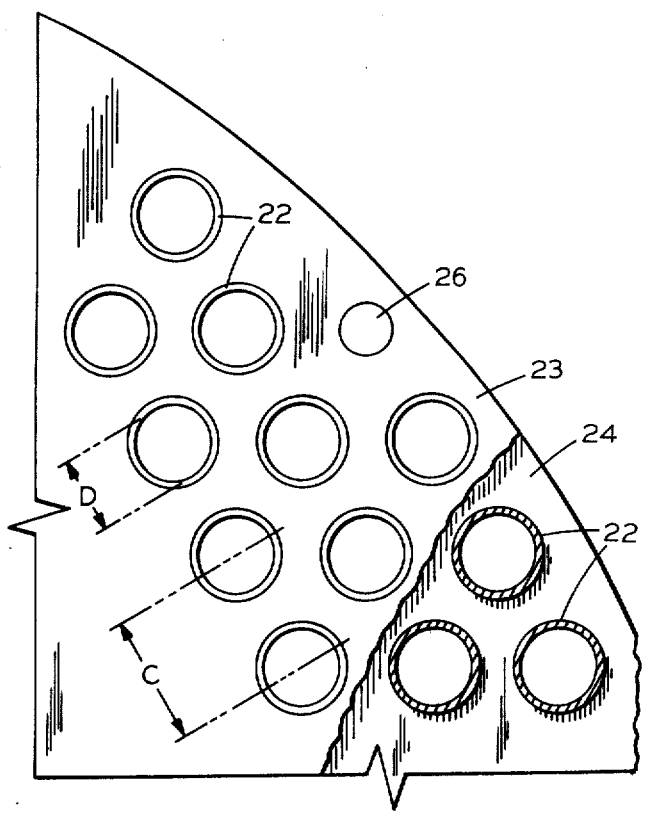
FIG. 6 is an enlarged detailed view in horizontal section through the interior of the heat exchanger apparatus of FIG. 4, some parts broken away and some parts shown in section.
Figure 3:
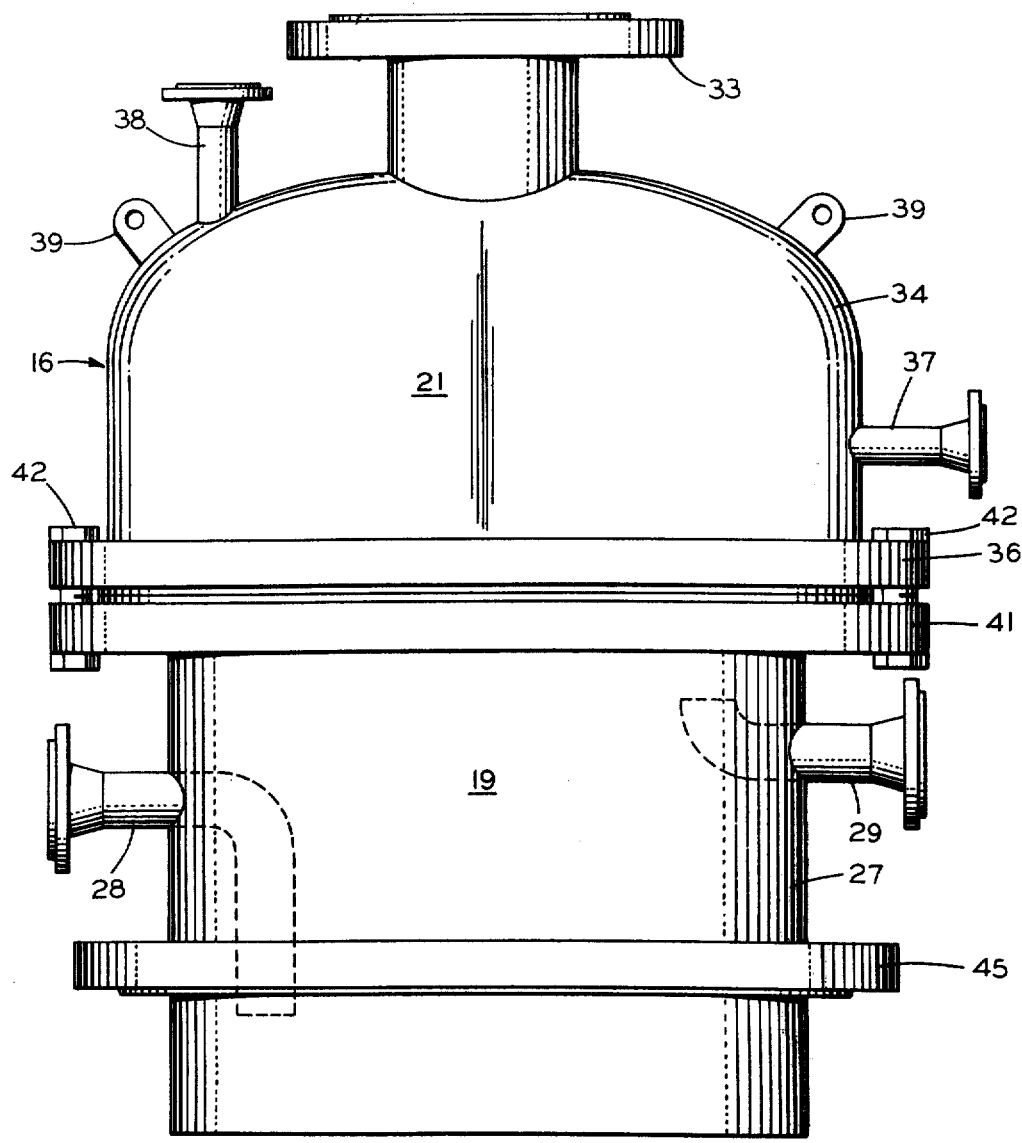
FIG. 3 is a detailed view in side elevation of the shell and tube heat exchanger apparatus used in the falling strand devolatilizer apparatus of FIG. 1.
Figure 5:
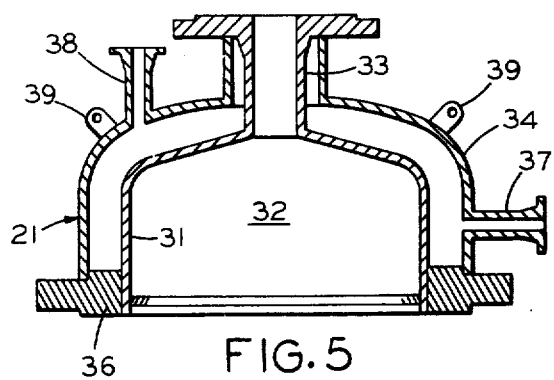
FIG. 5 is a vertical sectional view through an embodiment of a header arrangement suitable for use in the heat exchanger apparatus of FIG. 4.

Turning to FIG. 1, there is seen illustrated one embodiment of apparatus suitable for the practice of this invention, such embodiment of a falling strand devolatilizer being herein designated in its entirety by the numeral 15. Falling strand devolatilizer 15 can be considered to be composed of a shell and tube heat exchanger assembly herein designated in its entirety by the numeral 16, a flash tank 17, and a hold tank 18.

The shell and tube heat exchanger assembly 16 is more particularly described and illustrated by reference to FIGS. 4 through 8. The heat exchanger assembly 16 is comprised of a shell and tube heat exchanger body section 19 and a bonnet or header section 21. Within the body section 19 are mounted a plurality of spaced, parallel tubes composed of steel or the like. Tubes 22 extend between and are mounted into at their respective opposite end regions a pair of plates 23 and 24, as by welding or the like, the plates 23 and 24 as are all other elements of this heat exchanger being typically composed of steel or the like. Spacing between plates 23 and 24 and rigidity for the entire assembly of plates 23 and 24 and tubes 22 is augmented by tie rods 26. Tubes 22 are thus placed in sealing engagement with plates 23 and 24. Tubes 22 are circumferentially encased by a shell or wall 27, thereby to provide a generally sealed interior region between tubes 22 and the interior wall of shell 27 for circulation of heat transfer fluid. Thus, pipe and flange assembly 28 is adapted for input of heat exchange fluid into shell 27 while pipe and flange assembly 29 is adapted for removal of such heat exchange fluid from shell 27.

Bonnet 21 has an inner wall 31 which defines a generally domed shaped cavity 32. Entrance to cavity 32 is had through the pipe and flange assembly 33 which is generally coaxial with inner wall 31. In order to maintain cavity 32 at some predetermined temperature, wall 31 is jacketed by a housing 34. A mounting flange 36 at the base of bonnet 21 is conveniently employed as a mounting aid for housing 34 and wall 31. Heat exchange fluid may be conveniently input between housing 34 and wall 31 through pipe and flange assembly 37 and removed therefrom through pipe and flange assembly 38. Tabs 39 are conveniently provided for moving and lifting the bonnet 21; all parts are conveniently mounted together by means of welding or the like.

Circumferentially, about the upper end of body section 19 is a flange 41. Flanges 36 and 41 are adapted for mating face-to-face engagement with one another, these flanges being secured together by means of nut and bolt assemblies 42, there being a convenient sealing means (not shown) positioned between the flanges 36 and 41. A flange 45 is provided on body section 19 for mounting the combined assembly of body section 19 and bonnet 21 on flash tank 17.

Flash tank 17 of devolatilizer 15 is of double walled jacketed construction (see FIG. 2) for purposes of controlling the interior temperatures of the tank 17 during operation of the devolatilizer 15. A vapor take-off port is provided by the pipe and flange assembly 43 for tank 17 which communicates with the interior space of the tank 17. Pipe and flange assembly 43 is interconnected with a vacuum pump 44 which is adapted to maintain the interior space of the tank 17 at some predetermined subatmospheric pressure, preferably, and is further adapted to pull off vapors evolved in the tank 17 during operation of the devolatilizer 15. Preferably, a condenser (not shown) is interposed between the pump 44 and the pipe and flange assembly 43 to permit recovery of vapors removed from tank 17 during operation of the devolatilizer 15.

Hold tank 18 communicated with flash tank 17 by means of the interconnecting pipe 46. The shell and tube assembly 16 is mounted atop and protrudes into the flash tank 17, the shell and tube heat exchanger assembly 16 being mounted into the flash tank 17 by means of the aforementioned flange assembly 43. Hot melt to be devolatilized is conveniently input into bonnet 21 via pipe and flange assembly 47 which interconnects with the pipe and the flange assembly 33. Pipe and flange assembly 47 interconnects with a melt pump 48 which is adapted to input into the heat exchanger assembly 16 an appropriate composition to be devolatilized.

When heat exchanger 16 and flash tank 17 are to be operated as a single stage of falling strand devolatilization, tank 18 is conveniently used as a reservoir for receipt of devolatilized material from the interior of flash tank 17. When, on the other hand, it is desired to utilize two successive stages of falling strand devolatilization, the tank 18 can be used as a second flask tank and when so used, an appropriate vapor take-off port therein (not shown) is conveniently connected to an appropriate pump, and if desired, condenser means for removal of vapors evolved from the tank 18. In order to control the movement of material from the bottom regions of the flash tank 17 into the hold tank 18 through the pipe 46, the falling strand devolatilizer 15 has conveniently mounted across and within pipe 46 a plug type valve assembly (details of the plug not being shown) which is adapted to regulate the rate of egress of fluid material from the bottom of the flash tank 17 into the tank 18. Such valve assembly includes in devolatilizer 15 long-stem 50 which extends upwardly through the flash tank 17 and through an appropriate channel axially located in the heat exchanger assembly 16, axially through the pipe and flange assembly 47 to project into a pedestal 49, there being an appropriate sealing means about the valve stem 50 in the upper region of the pipe and flange assembly 47. An actuator assembly 52 on the top side of pedestal 49 has a shaft 53 which engages the upper end of stem 50 by means of a collar 54. Actuator assembly 52 is adapted to reciprocally move the plug type valve assembly through reciprocally moving the valve stem 50. The actuator 52 is responsive to a level sensor assembly (not shown) adapted to measure fluid level in the bottom region of tank 17. A controller assembly (not shown) couples the level sensor with the actuator assembly 52 to complete the remote control of a power-actuated valve assembly in the base of the tank 17.

Fluid material in the bottom of the tank 18 is conveniently removed therefrom by means of a conventional pumping screw assembly 56, such screw assembly 56 being interconnected with the tank 18 by pipe 57.

For purposes of the present invention, each of the tubes 22 in body section 19 of shell and tube heat exchanger 16 should have a length of from about 2 to 8 feet (preferably from about 3 to 6 feet). In addition, each such tube member should have an average inside diameter which is generally constant with respect to the length thereof and such diameter should range from about 0.5 to 1.5 inches. The ratio of tube length to tube diameter (each tube) should range from about 30 to 80. The number of individual tubes is a given heat exchanger assembly 16 should be such that, for a given number of pounds of composition to be devolatilized, the relationship between such composition and the total number of such tubes is such that the amount of such composition ranges from about 3 to 20 pounds per hour per tube (and preferably from about 5 to 10 pounds per hour per tube). For purposes of the present invention, tube length is conveniently measured by a dimension such as that marked L in FIG. 7, while the diameter of a tube refers to the internal diameter and is illustrated by that marked D in FIG. 6. The distance between centers of adjacent tubes, such as the distance marked C in FIG. 6, or the tube arrangement are relatively unimportant for purposes of the present invention so long as an appropriate heat flux through tubes 22 can be maintained for purposes of practicing the present invention in any particular use situation.

Figure 7:
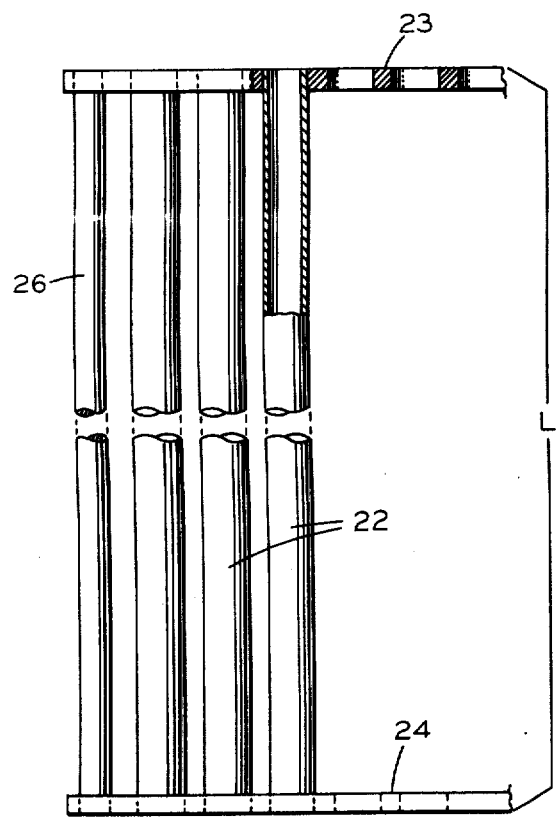
FIG. 7 is an enlarged detailed view in vertical section through a portion of the shell and tube heat exchanger assembly of FIG. 4.
Figure 8:
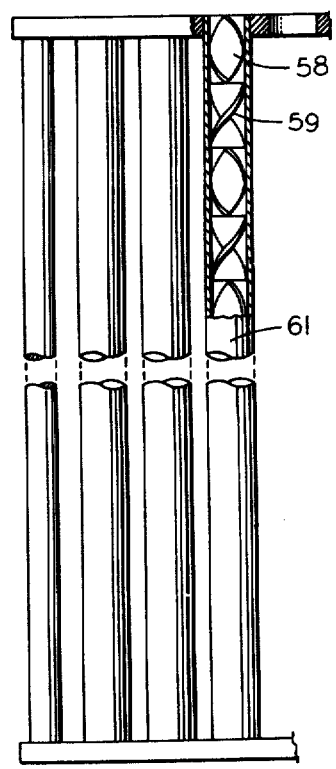
FIG. 8 is a view similar to FIG. 7 but showing an alternative embodiment of tube construction for the heat exchanger assembly of FIG. 4.

While it is generally preferred for purposes of the present invention to use tubes 22 in body section 19 which are without obstruction from input end to output end (as illustrated in FIG. 7), it will be appreciated that one may employ, in place of the tubes illustrated in FIG. 7, such as are illustrated in FIG. 8 where each one of the individual tubes is equipped with fixed mixing vanes, such as vanes 58 and 59. Such vanes enable one to maintain a hot melt steam or process fluid passing through a tube 61 which is equipped with such vanes 58 and 59 on a substantially radially isothermal basis so as to virtually eliminate melt stream radial temperature gradients which might tend otherwise to be inherently formed within tubes of a heat exchanger assembly. Such vanes tend to eliminate radial temperature gradients and provide substantially uniform viscosity and substantially precise gauge control. To reduce temperature gradients within a tube 61, an operator simply sets the wall temperature of a tube such as 61 to be equal to the center core temperature of the melt stream exiting from such a tube 61, as those skilled in the art will appreciate.

Figure 2:
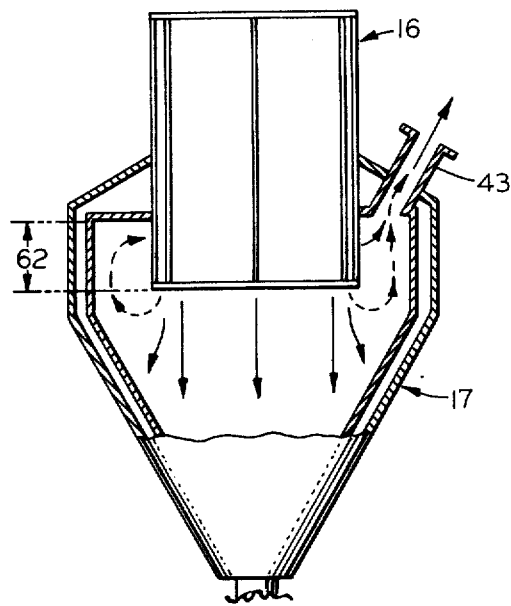
FIG. 2 is a schematic type view of the shell and tube heat exchanger and first flash chamber of the falling strand devolatilizer apparatus of FIG. 1 illustrating the practice of the present invention.

The operation of the combination of shell and tube heat exchanger assembly 16 and flash tank 17 is illustrated by reference to FIG. 2. Heated composition to be devolatilized enters the tank 17 from the bottom of exchanger assembly 16 and the monomer vapor is promptly flashed away from the polymer melt. The vapor is taken off through pipe and flange assembly 43 in the top of tank 17. The annular area 62 defined within vessel 17 by the inner walls of vessel 17 and the adjoining wall of heat exchanger assembly 16 acts as a manifold-like device to collect the vapor and direct it out pipe and flange assembly 43. In FIG. 2, the solid line arrows illustrate polymer flow while the dotted lines illustrate vapor flow. By having the heat exchanger assembly 16 recessed in the upper region of the tank 17, the tendency of polymer to be thrown within the tank 17 radially sidewardly and hence into the mouth of the pipe and flange assembly 43 is avoided, as those skilled in the art will appreciate.

Typically a devolatilized material which has collected in the bottom of a vessel or flash tank 17 may be removed from such by gravity flow, as is above, for example, when the vessel 17 is interconnected with a second tank which serves as a second flash tank or hold tank (see, for example, FIG. 1). It is preferred, however, when removing devolatilized fluid material from a vessel 17 or from a second flash tank for further processing at some subsequent processing station or zone, to pump this so devolatilized fluid material through appropriate conduit means (see, for example, pump means 56 in FIG. 1) away from the flash tank for ease in processing, as those skilled in the art will appreciate.

In one preferred mode of practicing the processes of the present invention, using the above described apparatus thereof, the production of low molecular weight polymer is controlled in a given polystyrene product within the range of from about 2 to 15 weight percent based on total product weight. In operating according to this mode, one employs pressures ranging from about 50 to 800 mmHg absolute in the flash vaporization zone, the other process variables being as herein above indicated.

Those skilled in this art will appreciate that the term "oligomers" as used herein has reference to dimers, trimers, and even tetramers of styrene while the term "low molecular weight polymer" (in reference to styrene) has reference to a polymer of many repeating units; this last term happens to be somewhat relative in this art and typically may include styrene polymers having from as low as about 50 up to about 1,000, with chain lengths of about 100 being particularly common.

Figure 9:
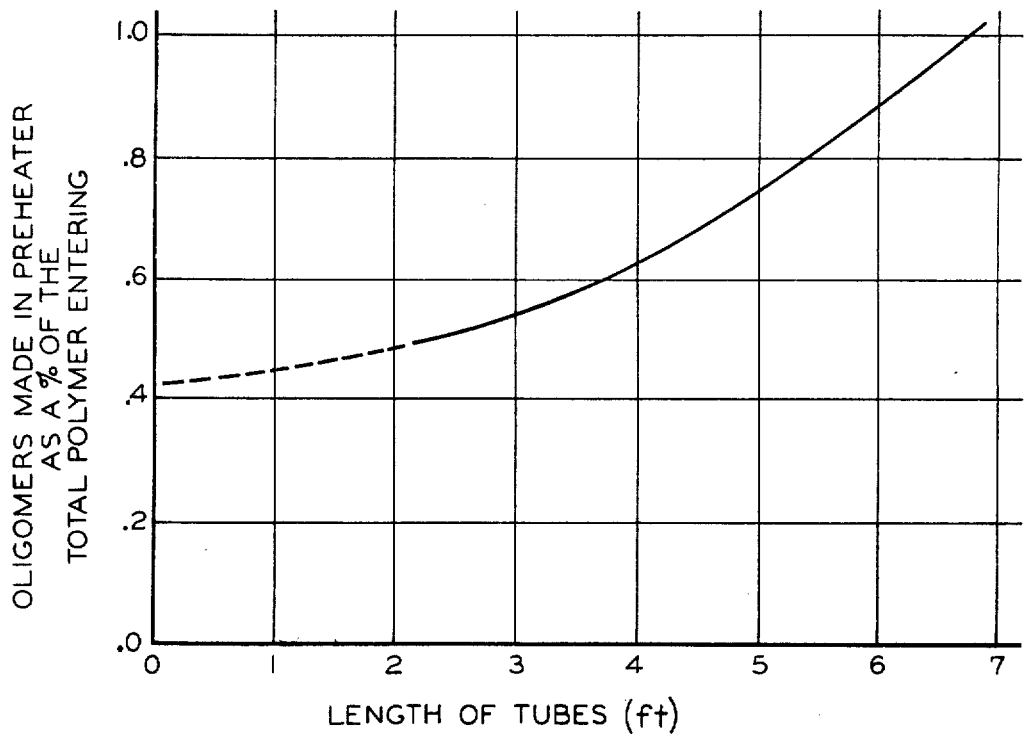
FIG. 9 is a plot illustrating the effect of tube length on styrene oligomers formed during falling strand devolatilization utilizing a shell and tube heat exchanger assembly of the type employed in the technique of the present invention.
Figure 10:
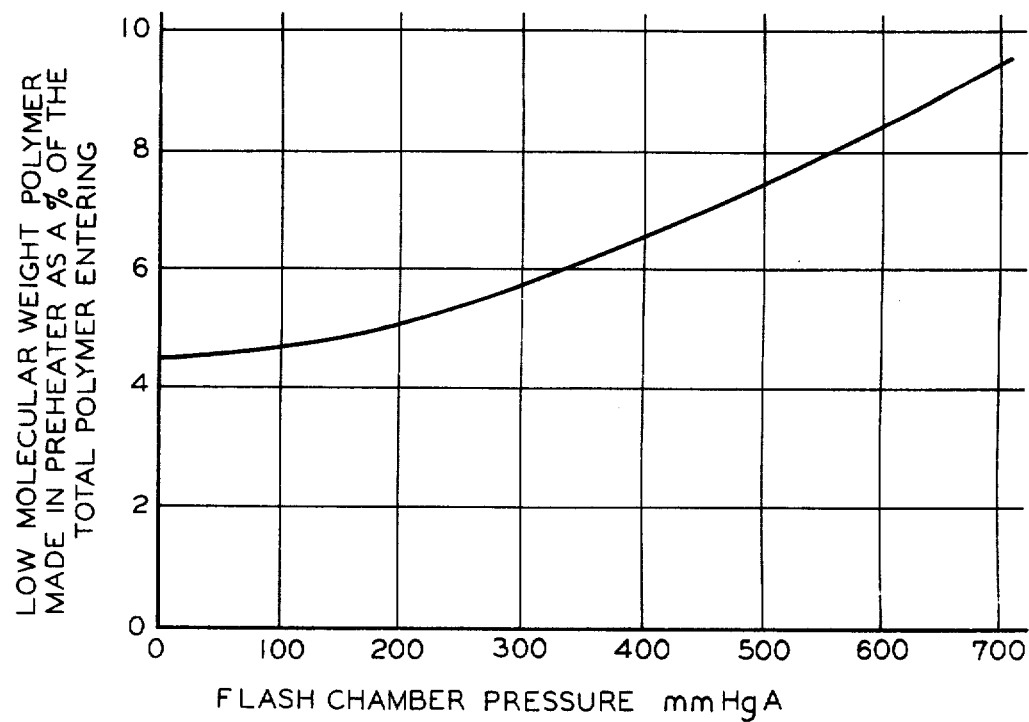
FIG. 10 is a plot illustrating the relationship between flash chamber pressure and low molecular weight polymer made in the preheater shell and tube type heat exchanger assembly (as a weight percentage of the total homopolystyrene polymer entering such preheater) in the practice of the technique of the present invention.

FIGS. 9 and 10 illustrate graphically processes of using the apparatus described above and the effects upon product properties. Thus, in FIG. 9, the invention is being practiced to minimize oligomer production while in FIG. 10 the invention is being practiced to control the quantity of low molecular weight polymer made. These Figures are believed to be self-explanatory particularly taken with the examples given below.

FIGS. 11-13 illustrate the effect of polymerizing in apparatus of this invention under the process made for controlling low molecular weight polymer production sufficient styrene monomer to create a low molecular weight fraction (or "tail") in a given styrene polymer. Such fraction broadens the molecular weight distribution of the product polymer being devolatilized so that, for example, when this so devolatilized product enters a die (such as a stranding die), it has a broadened distribution of polymer chain lengths than would otherwise be the case. This feature of this invention is useful in various situations, such as when it desired to broaden the molecular weight distribution of a polystyrene produced upstream in a continuous mass polymerization process (to tailor product polymer properties for various specific end use applications).

SPECIFIC EXAMPLES

Exemplary of the efficacy of the present invention are the following specific examples wherein all parts and percentages are on a weight basis unless otherwise indicated:

EXAMPLES 1 – 4

The following examples illustrate the practice of the present invention in minimizing the production of styrene oligomers using apparatus such as that described above in reference to FIGS. 1–7 and employing a single stage of falling strand devolatilization (one shell and tube heat exchange assembly as a preheater zone followed by one zone of flash vaporization).

First is presented a generalized discription of starting materials, process conditions, and resulting polymer products. Thereafter the results of individual exemplory runs are summarized in a Table I.

A styrene polymer melt composition comprising from about 50 to 80 weight percent homopolystyrene with the balance up to 100 weight percent thereof being unreacted styrene monomer is fed to the preheater at temperatures of from about 140° to 180° C. and an input pressure of from about 5 to 25 psi, using a flow rate of from about 6 to 13 pounds per hour per tube.

The preheater comprised about 450 to 900 tubes each about 3 to 6 feet long and about 0.9 inches in inside diameter arranged as a single pass shell and tube preheater. Heat transfer fluids pass counter currently through the shell side at temperatures of from about 200° to 280° C. so that the total heat flux relative to such composition passing therethrough ranges from about 500 to 4000 BTU per hour per square foot.

The residence time of each portion of said composition in each tube ranges from about 3 to 5 minutes. The output temperature of such composition as it exits from each tube ranges from about 200° to 250° C. and is thus from about 40° to 140° C. hotter than its input temperature. The output pressure is determined by the pressure being maintained in the flash tank. Flash tank pressures range from about 5 to 150 mmHg abs so that the output pressure of each composition is thus from about 5 to 25 psi less than the input pressure. Interior temperatures within the flash vaporization zone range from about 200° to 280°C.

EXAMPLES 5 – 8

The following examples illustrate the practice of the present invention in controlling the production of low (from about 10,000 to 80,000 number average) molecular weight of homopolystyrene polymer to from about 2 to 15 weight per cent based on total product weight per cent based on total product homopolystyrene polymer weight using apparatus such as that described above in reference to FIGS. 1–7 and employing two stages of falling straind devolatilization (one shell and tube heat exchanger assembly as a preheater zone followed by two successive zones of flash vaporization).

First is presented a generalized description of starting materials, process conditions, and resulting polymeric products. Thereafter, the results of individual exemplary runs are summarized in a Table II.

A styrene polymer melt composition comprising from about 50 to 80 weight per cent homopolystyrene with the balance up to 100 weight per cent thereof being unreacted styrene monomer is fed to the preheater at temperatures of from about 140° to 180° C. and an input pressure of from about 10 to 40 psi using a flow rate of from about 3 to 15 pounds per hour per tube.

The preheater comprised about 1800 tubes each about 3 feet long and about 0.9 inches in inside diameter arranged as a single pass shell and tube preheater. Heat transfer fluid pass counter-currently through the shell side at temperatures of from about 140° to 280° C. so that the total heat flux relative to such composition passing therethrough ranges from about 500 to 4000 BTU per hour per square foot.

The residence time of each portion of said composition in each tube ranges from about 2 to 10 minutes. The output temperature of such composition as it exits from each tube ranges from about 180° to 280°C. and is thus from about 40° to 160° C. hotter than its input temperature. The output pressure is determined by the pressure being maintained in the flash tank. Flash tank pressures range from about 50 to 800 mm Hg. absolute so that the output pressure of such compositions is thus from about 10 to 40 psi less than the input pressure. Interior temperatures within the flash vaporization zone range from about 180° to 280° C.

TABLE I

| Quantity or Condition | Ex. No. 1 | 2 | 3 | 4 |
|---|---|---|---|---|
| Starting Composition (100% wt. basis) | | | | |
| (A) Homopolystyrene wt. % | 70.0 | 70.0 | 70.0 | 70.0 |
| (B) Styrene monomer wt. % | 29.6 | 29.6 | 29.6 | 29.6 |
| (C) Oligomers wt. % | 0.4 | 0.4 | 0.4 | 0.4 |
| Process Conditions | | | | |
| (A) Starting Composition Temp. °C. | 150 | 150 | 150 | 150 |
| (B) Starting Composition Pressure psi | 14 | 17 | 20 | 24 |
| (C) Starting Composition Flow Rate (lbs./hr./tube) | 6.3 | 8.3 | 10.4 | 12.5 |
| (D) No. exchanger tubes | 910 | 678 | 543 | 455 |
| (E) Tube diameter (I.D. in in.) | 0.9 | 0.9 | 0.9 | 0.9 |
| (F) Tube length (ft.) | 3 | 4 | 5 | 6 |
| (G) Heat transfer fluid temp. °C. | 279 | 279 | 279 | 279 |
| (H) Avg. heat flux (BTU/hr./ft.²) | 1200 | 1200 | 1200 | 1200 |
| (I) Residence time (avg.) of composition in each preheater tube (min.) | 3 | 4 | 4.5 | 5 |
| (J) Output temp. of composition (°C.) | 225 | 225 | 225 | 225 |

TABLE I-continued

| Quantity or Condition | Ex. No. 1 | Ex. No. 2 | Ex. No. 3 | Ex. No. 4 |
|---|---|---|---|---|
| (K) Output press. of composition (psi) | 0.5 | 0.5 | 0.5 | 0.5 |
| (L) Flash chamber temp. (°C.) | 235 | 235 | 235 | 235 |
| (M) Flash chamber press. (mmHg absolute) | 25 | 25 | 25 | 25 |
| (N) Residence time (avg.) of hot melt in flash chamber (min.) | 5 | 5 | 5 | 5 |
| Product Composition (100% wt. basis) (recovered from flash tank) | | | | |
| (A) Homopolystyrene wt. % | 99.0 | 98.9 | 98.8 | 98.7 |
| (B) Styrene monomer wt. % | 0.1 | 0.1 | 0.1 | 0.1 |
| (C) Styrene oligomers wt. % | 0.9 | 1.0 | 1.1 | 1.2 |

TABLE II

| Quantity or Condition | Ex. No. 5 | Ex. No. 6 | Ex. No. 7 | Ex. No. 8 |
|---|---|---|---|---|
| Starting Composition (100% wt. basis) | | | | |
| (A) Homopolystyrene wt. % | 70.0 | 70.0 | 70.0 | 70.0 |
| (B) Styrene monomer wt. % | 29.4 | 29.4 | 29.4 | 29.4 |
| (C) Oligomers wt. % | 0.6 | 0.6 | 0.6 | 0.6 |
| (D) Homopolystyrene molecular wt. (no. avg.)($\times 10^5$) | 1.4 | 1.4 | 1.4 | 1.4 |
| Process Conditions | | | | |
| (A) Starting Composition (temperature °C.) | 160 | 160 | 160 | 160 |
| (B) Starting composition pressure (psi) | 17 | 20 | 26 | 30 |
| (C) Starting composition flow rate (lbs./hr./tube) | 4.7 | 4.7 | 4.7 | 4.7 |
| (D) No. exchanger tubes | 1800 | 1800 | 1800 | 1800 |
| (E) Tube diameter (I.D. in in.) | 0.9 | 0.9 | 0.9 | 0.9 |
| (F) Tube length (in ft.) | 3 | 3 | 3 | 3 |
| (G) Heat transfer fluid temp. °C. | 279 | 279 | 279 | 279 |
| (H) Avg. heat flux (BTU/hr./ft$^2$) | 800 | 800 | 800 | 800 |
| (I) Residence time (avg.) of composition in each preheater tube (min.) | 5 | 6 | 6.5 | 7 |
| (J) Output temperature of composition (°C.) | 250 | 250 | 250 | 250 |
| (K) Output pressure of composition (psi) | 1 | 4 | 10 | 14 |
| (L) Flash chamber temp. (°C.) | 255 | 255 | 255 | 255 |
| (M) Flash chamber pressure (mmHg absolute) | 50 | 200 | 500 | 700 |
| (N) Residence time (avg.) of hot melt in flash chamber (min.) | 5 | 5 | 5 | 5 |
| (O) Flash chamber temp. (°C.) | 260 | 260 | 260 | 260 |
| (P) Flash chamber pressure (mmHg absolute) | 10 | 10 | 10 | 10 |
| (Q) Residence time (avg.) of hot melt in flash chamber (min.) | 5 | 5 | 5 | 5 |
| Product Composition (100% wt. basis) (recovered from flash tank) | | | | |
| (A) Homopolystyrene wt. % | 94.1 | 93.5 | 90.8 | 88.9 |
| (B) Styrene monomer wt. % | 0.1 | 0.1 | 0.1 | 0.1 |
| (C) Styrene oligomers wt. % | 1.2 | 1.3 | 1.5 | 1.7 |
| (D) Low molecular wt. styrene polymers wt. % | 4.6 | 5.1 | 7.6 | 9.3 |
| (E) Molecular wt. of product styrene polymer (no. avg.) ($\times 10^5$) | 1.25 | 1.2 | 1.11 | 0.93 |

What is claimed is:

1. In a continuous process for the devolatilization of homopolystyrene, said process using as a starting process fluid a composition comprising from about 50 to 85 weight percent homopolystyrene and correspondingly about 50 to 15 weight per cent styrene monomer to falling strand devolatilization of the type wherein said composition is subjected first to heating and then to flash vaporization of said monomer, said composition being at an initial input temperature of from about 130° to 200°C. and at initial input pressure of from about 5 to 50 psi, the improvement in such a process which comprises the steps of:

A. passing said composition through a plurality of heating zones:
  1. each of said heating zones having a generally columnar shape,
    a. each one of such heating zones having:
      a length of from about 2 to 8 feet,
      an average inside diameter which is generally constant with respect to said length thereof and which ranges from about 0.5 to 1.5 inches,
      a ratio of said length to said diameter ranging from about 30 to 80, and
    b. the relationship between said composition and all of said heating zones being such that the amount of said composition flowing through said zones ranges from about 3 to 20 lbs./hr./heating zone,
2. each of said heating zones having its side wall portions defined by a heat exchange solid surface whose total heat flux relative to said composition passing therealong ranges from about 500 to 4000 BTU/hr./ft.$^2$,
3. the residence time of each portion of said composition in a given one of said heating zones ranging from about 2 to 10 minutes,
4. the output temperature of said composition as it exits from each individual one of said heating zones ranging from about 40 to 160°C. greater than said input temperature,
5. the output pressure of said composition as it exits from each individual one of said heating zones being from about 5 to 50 psi less than said input pressure, and
6. said plurality of heating zones being tubes encased in a body section of a shell and tube heat exchanger assembly, said tubes being generally equally spaced throughout said assembly, said composition flowing as a plurality of strands from the bottom section of said assembly, B. discharging said strands of said composition from each of said tubes of said assembly into a flash vaporization zone, downwardly through a central region of said flash zone, wherein said monomer vapor is separated from said homopolystyrene, said assembly being recessed in an upper region of said flash zone defining an annular area with the walls of said flash zone as a manifold-like device, collecting said vapor and directing said vapor out of a vapor take-off port in said device, controlling the temperature of said flash vaporization zone from about 180° to 280°C. and the pressure of said flash vaporization zone from about 2 to 800 mm Hg abs while continuously removing from said flash vaporization zone said monomer vapor at a rate at least approximately equal to the rate of generation thereof in said flash vaporization zone.

2. In a continuous process for the production of homopolystyrene in which the production of styrene oligomers therein is minimized, said process using as a starting process fluid a composition comprising from about 50 to 85 weight per cent homopolystyrene and correspondingly from about 50 to 15 weight per cent styrene monomer to falling strand devolatilization of the type wherein said composition is subjected first to heating and then to flash vaporization of said monomer, said composition being at an initial input temperature of from about 130° to 200°C. and at initial input pressure of from about 5 to 50 psi, the improvement in such a process which comprises the steps of:

A. passing said composition through a plurality of heating zones:
1. each of said heating zones having a generally columnar shape,
   a. each one of such heating zones having:
      a length of from about 2 to 8 feet,
      an average inside diameter which is generally constant with respect to said length thereof and which ranges from about 0.5 to 1.5 inches,
      a ratio of said length to said diameter ranging from about 30 to 80, and
   b. the relationship between said composition and all of said heating zones being such that the amount of said composition flowing through said zones ranges from about 3 to 20 lbs./hr./heating zone,
2. each of said heating zones having its side wall portions defined by a heat exchange solid surface whose total heat flux relative to said composition passing therealong ranges from about 500 to 4000 BTU/hr./ft.$^2$,
3. the residence time of each portion of said composition in a given one of said heating zones ranging from about 2 to 10 minutes,
4. output temperature of said composition as it exits from each individual one of said heating zones ranging from about 40° to 160°C. greater than said input temperature,
5. the output pressure of said composition as it exits from each individual one of said heating zones being from about 5 to 50 psi less than said input pressure, and
6. said plurality of heating zones being tubes encased in a body section of a shell and tube heat exchanger assembly, said tubes being generally equally spaced throughout said assembly, said composition flowing as a plurality of strands from the bottom section of said assembly, B. discharging said strands of said composition from each of said tubes of said assembly into a flash vaporization zone, downwardly through a central region of said flash zone, wherein said monomer vapor is separated from said homopolystyrene, said assembly being recessed in an upper region of said flash zone defining an annular area with the walls of said flash zone as a manifold-like device, collecting said vapor and directing said vapor out of a vapor take-off port in said device, controlling the temperature of said flash vaporization zone from about 180° to 280°C. and the pressure of said flash vaporization zone from about 2 to 200 mm Hg abs while continuously removing from said flash vaporization zone said monomer vapor at a rate at least approximately equal to the rate of generation thereof in said flash vaporization zone.

3. The process of claim 1 wherein each of such heating zones has a length of from about 3 to 6 feet.

4. The process of claim 2 wherein each of such heating zones has a length of from about 3 to 6 feet.

5. The process of claim 1 practiced so as to control the production of low molecular weight polymer within the range of from about 2 to 15 weight percent based on total product weight, said process employing in said discharging step a pressure in said flash vaporization zone ranging from about 50 to 800 mmHg abs.

6. The process of claim 1 wherein the relationship between such composition and the total number of such heating zones is such that the amount of such composition flowing through such zones ranges from about 5 to 10 pounds per hour per tube.

* * * * *